Jan. 2, 1923. 1,440,544.
A. KATZINGER.
BAKING PAN SET.
FILED APR. 2, 1921.
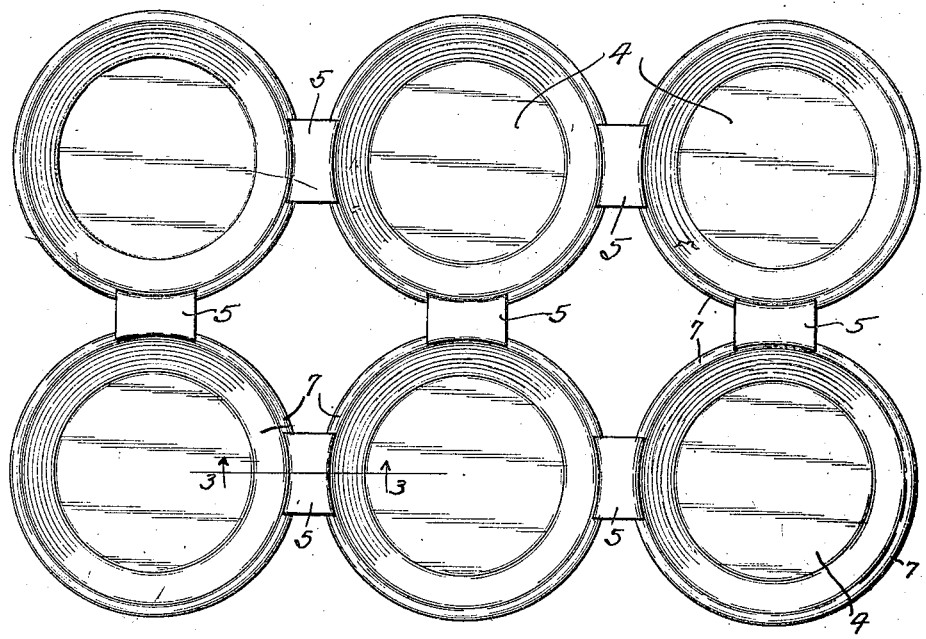
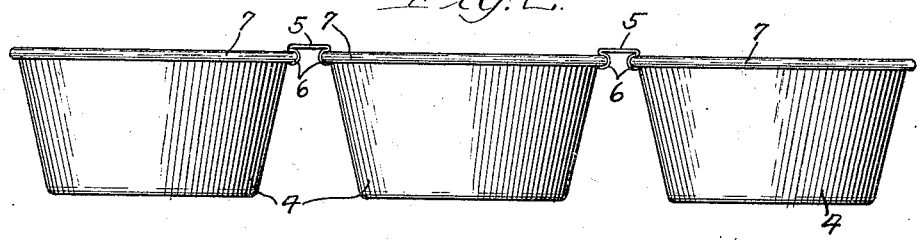
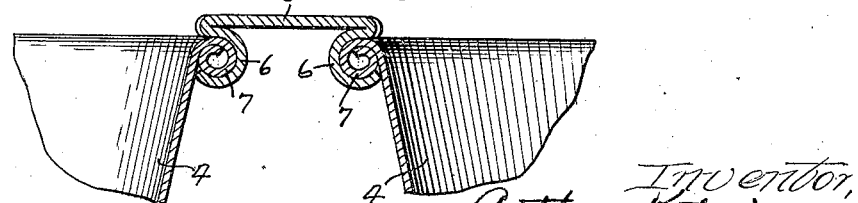

Patented Jan. 2, 1923.

1,440,544

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS.

BAKING-PAN SET.

Application filed April 2, 1921. Serial No. 457,895.

*To all whom it may concern:*

Be it known that I, ARTHUR KATZINGER, a citizen of the United States, residing at Chicago, in the county of Cook and State of Illinois, have invented certain new and useful Improvements in Baking-Pan Sets, of which the following is a specification.

My invention relates to bake pan sets and has for one of its objects a plurality of baking pans provided with narrow strip connectors for securing the pans in a set.

A further object is the provision of small baking pans such as are sometimes known as muffin pans arranged with spaces between the pans for permitting the free circulation of heated air in use.

A still further object is the provision of narrow strips each having its ends arranged in fixed relation with the curved edges of adjacent sides of circular baking or muffin pans.

Other objects will appear hereinafter.

An embodiment of my invention is indicated in the accompanying drawing, forming a part of this specification, and in which—

Fig. 1 is a plan view of a baking set embodying my invention;

Fig. 2 is a side elevation of the same; and

Fig. 3 is an enlarged fragmental section taken on line 3—3 of Fig. 1.

Referring more particularly to the drawing, I have indicated small circular baking pans, such as are commonly known as muffin pans. It will be apparent that my invention is capable of embodiment in pans of various sizes and shapes.

In the drawing, I have illustrated six small baking pans 4, but it will be understood that a fewer or greater number of pans may be secured in a set when so desired. The pans 4 are preferably arranged in rows so that the center lines of the rows running in one direction will be at substantially right angles to the lines running in the other direction so as to bring the adjacent rims of the pans somewhat close to each other for securing the pans in a set.

I provide narrow connecting members 5 between the adjacent edges of each pair of pan rims, as clearly indicated in Fig. 1. With my improved connectors 5 it is not necessary to provide a frame around the outer sides of the pan set. The manner of attaching my improved connectors 5 and the curved connections between such connectors and the pan rims provides a rigid construction.

In Fig. 3 I have indicated one of my connecting members 5 as having its end portions 6 bent back upon the central portion and curved around the rims 7 of two adjacent pan sides. It will be apparent that by making the member 5 of substantially stiff material the curved portions 6 when clamped on or otherwise formed in connection with the pan rims 7, will hold the pans 4 in rigid relation. I have indicated the curved portions 6 as passing more than half-way around the pan rims 7, but it will be understood that these curved portions 6 may be attached to the pan rims in any desirable manner. An important feature of the connectors is the curved connection between the ends of said connectors and the adjacent pan rims.

It should also be noted that the individual connectors 5 are comparatively short in length and narrow in width and when their arcuate edges are connected by the tubular extension 6 to the rims of the pans, as shown in Fig. 3, such connectors not only act as spreaders, but also to rigidly hold the series of circular pans in a permanent set. It will also be seen that by reason of the separate individual connectors the set of circular pans may be maintained in rigid relation to each other with minimum tendency toward warping of the whole set of pans when heat is applied during baking or at other times. In other words, the separate connectors for rigidly and permanently connecting the circular pans in a set will permit the bottoms of the pans to remain in the same planes so that they will be equally heated when placed in a baking oven.

Obviously those skilled in the art may make various changes in the details and arrangements of parts without departing from the spirit and scope of my invention as defined by the claims hereto appended and I wish therefore not to be restricted to the precise construction herein disclosed.

I claim:

1. A multiple bake pan set comprising a plurality of spaced-apart pans having arcuate adjacent edges, and a narrow connecting strip comparatively short in length and having arcuate edges conforming with and connected to the under sides of the said arcuate adjacent edges of said pans.

2. A baking pan set comprising a plurality of spaced-apart circular pans, a narrow strip of material with its edges conforming to the adjacent pan edges by being curved in conformity therewith, and means extending from the arcuate edges of said strip more than half way around the adjacent rims of said pans to permanently connect the pans in spaced-apart relation rigidly connected together.

3. A baking pan set comprising a plurality of spaced-apart circular pans, and a plurality of separate connectors each comparatively short in length and narrow in width and each having spaced-apart lateral clamping extensions arcuately conforming to the rims of the pans and extending more than half way around such rims to permanently clamp the same and hold the pans rigidly together in a set.

4. A series of circular pans comprising three or more, and a series of connectors comprising three or more separate clamps each having spaced-apart arcuate edges to conform to the arcuate edges of adjacent sides of said pans and each provided with tubular extensions circular in cross-section and adapted to pass more than half way around the rims of said pans with a clamping action to rigidly connect the pans in a set.

5. A baking pan set comprising a plurality of circular pans, and a series of separate sheet metal connectors each narrow in width and short in length and each having a flat top and arcuate edges with arcuate extensions from the latter in position to clamp adjacent edges of said pans to hold them in spaced-apart relation.

6. A connector for baking pan sets composed of circular pans, comprising a metallic device having spaced-apart arcuate edges conforming to the spaced-apart arcuate edges of the circular pans and fitting against the same, and also comprising spaced-apart curled clamps for gripping the spaced-apart arcuate edges of said pans to hold them rigidly connected together in a set while the edges of said pans retain their circular shapes.

7. A device integral throughout for connecting circular pans of baking pan sets, comprising a flat plate having spaced-apart arcuate edges with extensions adapted to be bent under the rims of said pans and curled to form clamps to grip the rims of such circular pans and hold them together in a set, said clamps being arcuate in conformity with the arcuate rims of the pans and with the arcuate edges of said flat plate.

In testimony whereof I have signed my name to this specification on this 31st day of March A. D. 1921.

ARTHUR KATZINGER.